June 29, 1937.     M. C. SPENCER     2,085,708
ALTERNATING CURRENT SHUNT MOTOR
Filed May 23, 1936     2 Sheets-Sheet 1

INVENTOR.
Millard Cole Spencer
BY Wm. J. Herdman
ATTORNEY.

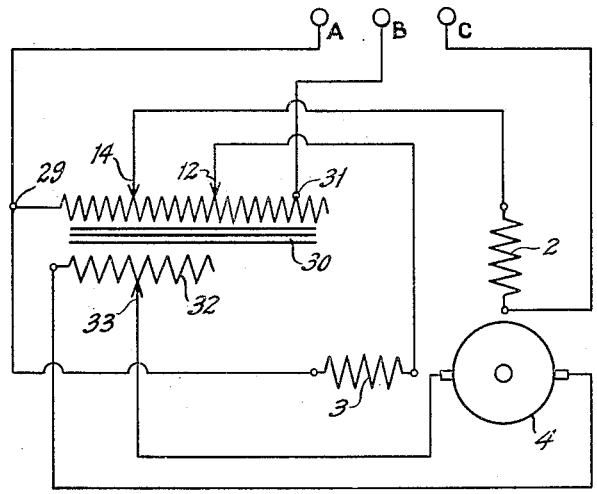
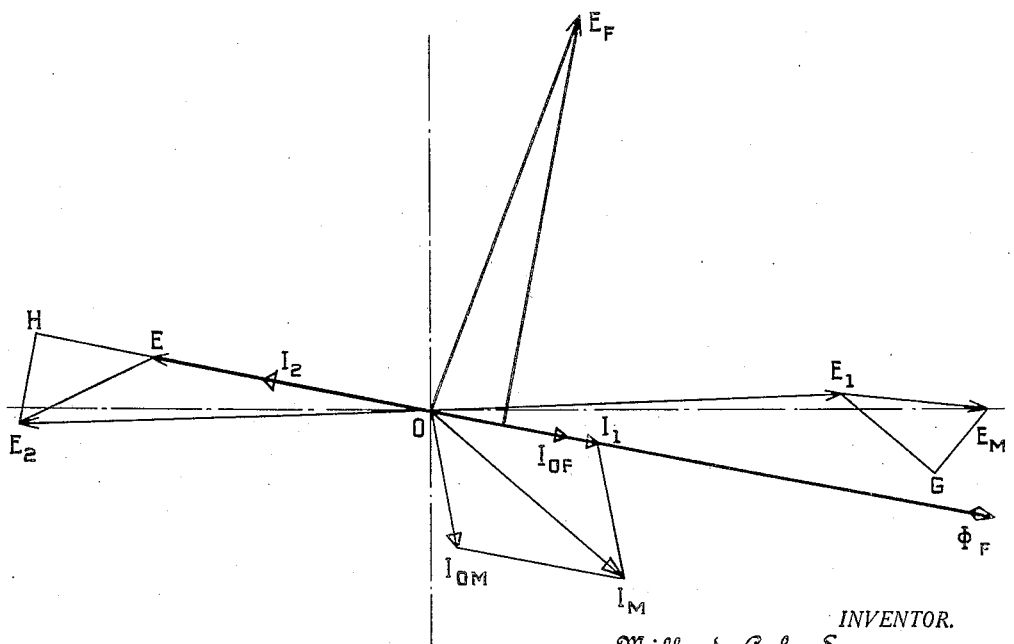

Patented June 29, 1937

2,085,708

UNITED STATES PATENT OFFICE 2,085,708

ALTERNATING CURRENT SHUNT MOTOR

Millard Cole Spencer, East Orange, N. J., assignor to Crocker-Wheeler Electric Manufacturing Company, Ampere, N. J., a corporation of New Jersey Application May 23, 1936, Serial No. 81,381

3 Claims. (Cl. 172—277)

My invention relates to electric motors and pertains in particular to alternating current motors.

Many attempts have hitherto been made to provide an effective and efficient alternating current shunt motor, but such motors have up to the present proved unsatisfactory. Any attempt to connect the field winding of an ordinary shunt motor in parallel with the armature winding across a single phase line results in the production of very little torque and the commutation is quite unsatisfactory for the reason that the magnetic flux set up by the field winding lags substantially 90 degrees behind the electromotive force which produces it, while the working current in the armature winding is more nearly in phase with the electromotive force. The armature current and the field flux are, therefore, out of phase with each other and since the torque of such motor is proportional to the product of the field strength, multiplied by the armature current at any particular instant, the torque efficiency of the motor is very low. The torque of an alternating current motor is, of course, proportional to the product of the field strength multiplied by the armature current multiplied by the cosine of the phase angle between them. Therefore, maximum torque efficiency may be attained only when the field flux and the working current in the armature are exactly in phase with each other.

It has been suggested that an alternating current shunt motor might be operated from a two phase power supply by connecting the field winding to one phase and the armature winding to the other phase. So connected, the field flux which lags 90 degrees behind the electromotive force producing it would be substantially in phase with the electromotive force of the second phase to which the armature is connected. However, the working current in the armature is not in phase with the electromotive force which produces it, but lags behind such electromotive force by a substantial angle so that in this case the torque efficiency of the motor is very low and its performance quite unsatisfactory.

One of the principal objects of my invention comprises producing an alternating current shunt motor having maximum torque efficiency.

Another object comprises producing an alternating current shunt motor in which the speed may be varied widely while the torque is maintained at maximum efficiency.

A still further object comprises producing a variable speed alternating current shunt motor in which the speed may be varied from sub-synchronous to hyper-synchronous and maximum torque efficiency maintained at all speeds.

I accomplish all of the above noted desirable results and others which will hereinafter be apparent by means of the novel structure, combination, inter-relation and arrangement of parts which will be hereinafter more specifically described with reference to the accompanying drawings forming a part of this specification and in which like numerals designate corresponding parts throughout.

Fig. 4 is a diagrammatic representation of a combination of the organizations of Figs. 2 and 3.

Fig. 5 is a vector diagram illustrating the relation of the field flux, electromotive forces and currents present in the operation of my motor.

I have discovered, experimentally verified and successfully demonstrated that an efficient alternating current shunt motor may be successfully achieved by connecting an impedance device or transducer such as, for example, a transformer or auto-transformer, to one of the phases of a three phase power supply and connecting a point on the transformer winding through the field winding of the motor to another phase of the three phase power supply in such manner that the electromotive force impressed on the field winding is in a proper phase relation with the electromotive force impressed on the terminals of the transformer to bring the field flux into time phase with the working current in the armature.

I have found that if the field winding connection to the transformer is made adjustable in its connection thereto by means of taps on the transformer winding or otherwise, the desired phase relation between the electromotive force supplied to the field winding and the phase to which the transformer is connected may be easily obtained in order to bring the field flux into exact time phase with the current in the armature to produce maximum torque efficiency for the motor at any desired speed.

Figure 1:
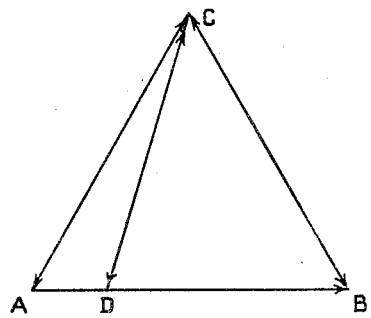
Fig. 1 is a diagram representing vectorally the relation of the electromotive forces of a three phase power supply source and that which I employ.
Figure 2:
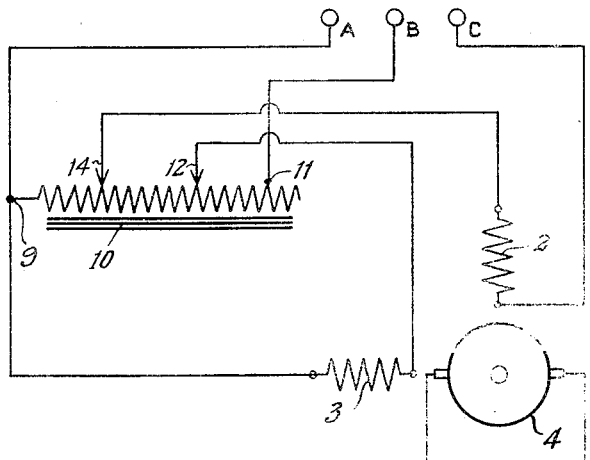
Fig. 2 is a diagrammatic representation of a two pole alternating current shunt motor utilizing an auto-transformer and embodying my invention.
Figure 3:
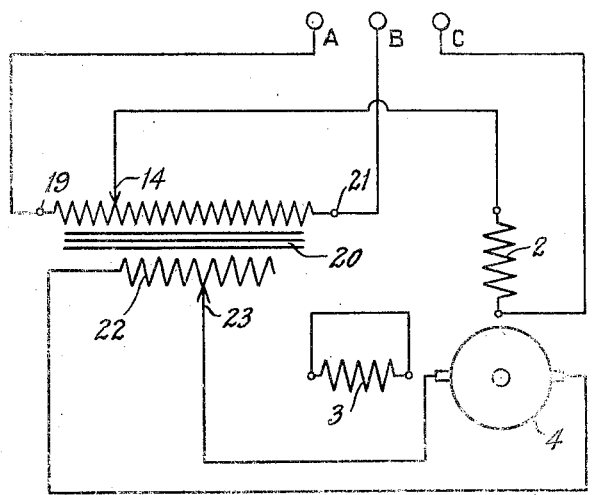
Fig. 3 is a diagrammatic representation of the organization of Fig. 2, but employing a transformer.

Referring now to the drawings, and especially to Figs. 1, 2 and 3:

In Fig. 1, I have shown a vector diagram of the electromotive forces of a three phase power supply source as existing between the conductors A, B and C. If a transformer is connected across lines A and B, it is well known that between the electrical center of the transformer winding and the third line C, an electromotive force may be obtained which is in 90° phase relation with the electromotive force across the line A, B. This is known as the Scott transformer connection.

I have found that by connecting the field winding of the motor between some tap, as D, Fig. 1, on the transformer and the line C, that any desired phase relation between the electromotive force applied to the field winding and the phase in the line A, B can be obtained.

A method of practically applying this discovery and adjusting the phase relation between the field flux and the working current in an alternating current shunt motor is shown in Fig. 2 which diagrammatically represents a two pole alternating current shunt motor and the associated apparatus and connections for carrying out my invention. The motor may be generally similar in construction to a direct current shunt motor except that the field ring is laminated as well as the armature core and the field ring carries two stator windings placed as shown 90 electrical degrees apart, or in electrical quadrature. One of these windings, 2, serves as the field winding for the motor and the other, 3, as a main or transformer winding for the armature 4. It is therefore placed as usual with its axis coincident with the axis of the winding on the armature. The armature 4 is provided as shown with two brushes in line with the axis of the main winding 3 and these brushes may be short circuited as shown and the working electromotive force induced in the armature by transformer action from the main stator winding 3. The current may of course be fed into the armature by direct conduction, but the method shown has the advantage of avoiding the handling of heavy currents at low voltage. It is desirable to keep the electromotive force of the armature as low as possible because the turns short circuited under the brushes are directly in line with the motor field and as this is an alternating current field and induces an electromotive force in the short circuited armature turns it sets up a current in the short circuited turns which increases the commutation difficulties, particularly at low speeds, and should therefore be kept as low as practical by winding the armature with as few turns and for as low a voltage as practical.

An auto-transformer 10 is connected across the lines A, B of one phase of the three phase power supply source. By providing this auto-transformer with taps and an adjustable contact 12, any desired electromotive force may be applied to the main stator winding 3 as a convenient means to adjust the speed of the motor by controlling the electromotive force induced in the short circuited armature. The auto-transformer 10 serves as a convenient means of adjusting the phase relation between the field winding 2 and the current in the armature or working current by connecting the field winding 2 between a tap 14 on transformer 10 and the third line, C, of the three phase system. By moving this adjustable connection 14 up and down along the transformer winding, the phase angle of the field of the motor may be adjusted to exactly coincide with the actual working current in the armature and, therefore, the torque of the motor is made a maximum for any given current in the armature.

The arrangement shown in Fig. 2 is such that the speed of the motor cannot be raised much above the speed it would have as an induction motor with the same number of poles. At synchronous speed what might be termed a back electromotive force is generated in the armature by the rotation of the armature conductors through the field flux and this back electromotive force is substantially equal to the maximum electromotive force which can be induced in the armature from the main field winding. As it is the difference between this back electromotive force and induced electromotive force which causes the effective working current in the armature and the rotation thereof, it is evident that a definite limit is placed upon the possible speed of the motor.

Such speed limitation can be overcome by the connection shown in Fig. 3, in which the transformer 20 is provided with a low voltage winding 22 and the working current directly conducted into the armature winding through the brushes by means of tap 23. In this way there is no particular limit to the electromotive force which can be applied to the armature and any desired speed can be obtained. Speeds even higher than the synchronous speed of a corresponding induction motor may be achieved, as well as sub-synchronous speeds. With this connection the winding 3 hitherto called the main winding, can be to advantage short circuited on itself as indicated and thus be made to serve as a compensating winding, reducing the effective reactance of the rotor winding and improving the performance of the motor. The primary winding of the transformer 20 is connected at 19 and 21 to lines A, B of a three phase source while the field winding 2 is connected between the tap 14 and the remaining line, C, of the source, as hereinbefore explained with relation to Fig. 2.

It is possible to combine the arrangement shown in Figs. 2 and 3 as shown in Fig. 4, where a part of the working current is conducted into the armature directly from the low voltage winding 32 of the transformer 30 from tap 33 and the balance of the working current in the armature 1 is caused to flow by the electromotive force induced into the winding from the main winding 3 connected to the primary of transformer 30, as described in connection with Fig. 2. As hitherto explained in connection with the arrangement shown in Fig. 2, the winding 2 of the motor is connected by means of tap 14 on the primary winding of transformer 30 to line C of a three phase power source, while the primary is connected at its terminals 29—31 between line A, B of the same source.

The performance of my motor can perhaps best be shown by means of the vector diagram, Fig. 5. In this diagram the vector $OE_M$ represents the electromotive force applied to the main stator winding 3 of the motor, as indicated in Fig. 2, while the vector $OE_F$ represents the electromotive force applied to the field winding 2. As explained in connection with Fig. 1, the phase angle between these two voltages is something less than 90° because of the adjustment of tap 14 on transformer 10. I have found that in motors I have constructed in accordance with my invention, that this angle is approximately 83° although, dependent upon design characteristics, it may vary from 70° to 85°. The electromotive force $E_F$ applied to the field winding causes a current $I_{OF}$ to flow in this winding. This current lags behind the electromotive force $E_F$ by nearly 90° and sets up a field flux $\Phi_F$ in phase with it. The electromotive force $E_M$ applied to the main winding sets up a magnetizing current $I_{OM}$ which also lags behind it nearly 90°. This electromotive force $E_M$ applied to the main winding, by transformer action, causes a working current $I_2$ to flow through the armature winding. This current $I_2$ has a component $I_1$ equal and opposite to it, which flows in the main winding.

The vector sum of the two currents $I_1$ and $I_{0M}$ flows in the main winding, and this current $I_M$ flowing through the main winding causes a voltage drop $GE_M$ at right angles to it due to the reactance of the stator winding, and a voltage $GE_1$ in phase with the current $I_M$ due to the resistance of the main winding. The transformer flux of the main winding generates in this main winding an electromotive force $OE_1$ and an equal and opposite electromotive force $OE_2$ in the rotor, assuming the transformer ratio between the two windings as being equal to one.

The current $I_2$ flowing through the armature causes a voltage drop $HE_2$ at right angles to the phase of the current, due to the reactance of the armature winding, and a voltage drop $EH$ due to the current flowing through the resistance of the armature winding, this resistance drop being in phase with the current. By rotation of the armature conductors through the field flux $\phi_F$ an electromotive force represented by the vector $OE$ is generated in the armature. The motor will run at such speed that the vector sum of this back electromotive force $OE$ plus $EH$ plus $HE_2$ is equal to the electromotive force $OE_2$ generated in the armature winding by transformer action from the main winding.

I have found by experiment that by adjusting the phase angle of the field electromotive force $E_F$ as hitherto explained, that the phase angle of the current $I_2$ can be made to coincide precisely with the phase angle of the flux $\phi_F$ or rather the projection of the vector of this flux into the fourth quadrant, as shown on the vector diagram, Fig. 5.

If the outer end of the vector $OE_F$ is made to move by adjusting the field return tap 14 on the transformer 10 to the left as viewed in Fig. 2, it is found that the current vector $I_2$ will be rotated in a clockwise direction, while the field flux vector will be rotated in a counterclockwise direction as viewed in the vector diagram throwing the armature current and field flux out of phase and reducing the torque of the motor. In a similar manner, if the outer end of the electromotive force vector $E_F$ is rotated in a clockwise direction by moving the field return tap in the opposite direction along the transformer, then the current vector $I_2$ will be rotated in a counter-clockwise direction again throwing the working current and field flux out of phase and reducing the torque of the motor.

It is therefore evident that by moving the field return tap on the transformer to the proper point on the transformer, that the armature current and the field flux can be brought precisely into phase and the torque efficiency of the motor made a maximum for any current in the armature winding.

It will be apparent from the foregoing that I have produced a simple and effective alternating current shunt motor having maximum torque efficiency and one in which the speed may be varied widely while the torque is maintained at such maximum efficiency.

While I have shown and described, by way of example only, one embodiment of my invention, it will be apparent that various changes may be made therein without departing from the intended scope and spirit of the invention. I do not, therefore, desire to limit myself to the foregoing except as may be pointed out in the appended claims, in which I claim:

1. An alternating current shunt motor comprising, a stator, a rotor, a field winding and a winding for producing a transformer flux, both of said windings being carried by said stator and positioned 90 electrical degrees from each other, a short-circuited rotor winding, a source of three phase current for energizing said windings, an auto-transformer connected across one of the phases of said source, said field winding being connected to another phase of said source through an adjustable connection with said auto-transformer whereby the phase angle of the flux produced by said field winding may be brought into exact time phase with the working current produced in said rotor winding by said transformer flux producing means to produce maximum torque efficiency for said rotor and said transformer flux producing winding being likewise adjustably connected to said auto-transformer for varying the electromotive force applied to said rotor winding to vary the speed of said motor.

2. An alternating current shunt motor comprising, a stator, a rotor, a field winding and a winding for producing a transformer flux, both carried by said stator and positioned 90 electrical degrees from each other, a winding on said rotor, a source of three phase current for energizing said windings, a transformer connected across one of the phases of said source, said field winding being connected to said transformer and to another phase of said source, means whereby said rotor winding may be energized from said transformer only through said transformer flux producing winding, said means including an adjustable connection with said transformer whereby the electromotive force in said rotor winding may be varied to vary the speed of said motor, and said connection of said field winding to said transformer being likewise adjustable to bring the phase angle of the flux produced by said field winding into exact time phase with the working current in the rotor winding to produce maximum torque efficiency for said motor.

3. An alternating current shunt motor comprising, a stator, a rotor, a field winding and a winding for producing a transformer flux, both of said windings being carried by said stator and positioned 90 electrical degrees from each other, a commutator associated with said rotor winding, brushes associated with said commutator, means for short-circuiting said brushes whereby said rotor winding is short-circuited through said commutator and brushes, a source of three phase current for energizing said windings, a transformer connected across one of the phases of said source, said field winding being connected to another phase of said source through an adjustable connection with said transformer whereby the phase angle of the flux produced by said field winding may be brought into exact time phase with the working current produced in said rotor winding by said transformer flux producing means to produce maximum torque efficiency for said motor, and said transformer flux producing winding being likewise adjustably connected to said transformer whereby the electromotive force applied to said rotor winding may be varied to vary the speed of said motor.

MILLARD COLE SPENCER.